United States Patent [19]

Innes

[11] Patent Number: 5,716,515
[45] Date of Patent: Feb. 10, 1998

[54] HIGH TEMPERATURE TREATMENT OF REFORMING CATALYST WITH AN INERT GAS

[75] Inventor: Robert A. Innes, San Rafael, Calif.

[73] Assignee: Chevron Chemical Company, San Ramon, Calif.

[21] Appl. No.: 450,697

[22] Filed: May 25, 1995

[51] Int. Cl.$^6$ .................... C10G 35/085; C10G 35/095; B01J 37/08
[52] U.S. Cl. .................... 208/137; 208/138; 502/85
[58] Field of Search .................... 208/137, 138; 502/85

[56] References Cited

U.S. PATENT DOCUMENTS

| | | | |
|---|---|---|---|
| 4,517,306 | 5/1985 | Buss | 502/74 |
| 4,539,304 | 9/1985 | Field | 502/85 |
| 4,539,305 | 9/1985 | Wilson et al. | 502/85 |
| 4,717,700 | 1/1988 | Venkatram et al. | 502/85 |
| 4,888,105 | 12/1989 | Huss et al. | 585/407 |
| 5,041,208 | 8/1991 | Patridge et al. | 208/138 |
| 5,106,800 | 4/1992 | Moser et al. | 208/138 |
| 5,116,794 | 5/1992 | Skeels et al. | 502/85 |
| 5,137,620 | 8/1992 | Robbins et al. | 208/138 |
| 5,382,353 | 1/1995 | Mulaskey et al. | 208/138 |

FOREIGN PATENT DOCUMENTS

| | | |
|---|---|---|
| 0 306 237 | 3/1989 | European Pat. Off. . |
| 0 448 366 | 9/1991 | European Pat. Off. . |

OTHER PUBLICATIONS

International Search Report, Jul. 16, 1996.

*Primary Examiner*—Walter D. Griffin
*Attorney, Agent, or Firm*—Burns, Doane, Swecker & Mathis

[57] ABSTRACT

A high temperature treatment process is disclosed for increasing conversion and reducing the fouling rate of reforming catalysts. The process comprises reducing the catalyst in a reducing gas atmosphere at a temperature below 1025° F. and then treating the reduced catalyst at a temperature of from 1025° F. to 1275° F. in an inert gas atmosphere.

21 Claims, 1 Drawing Sheet

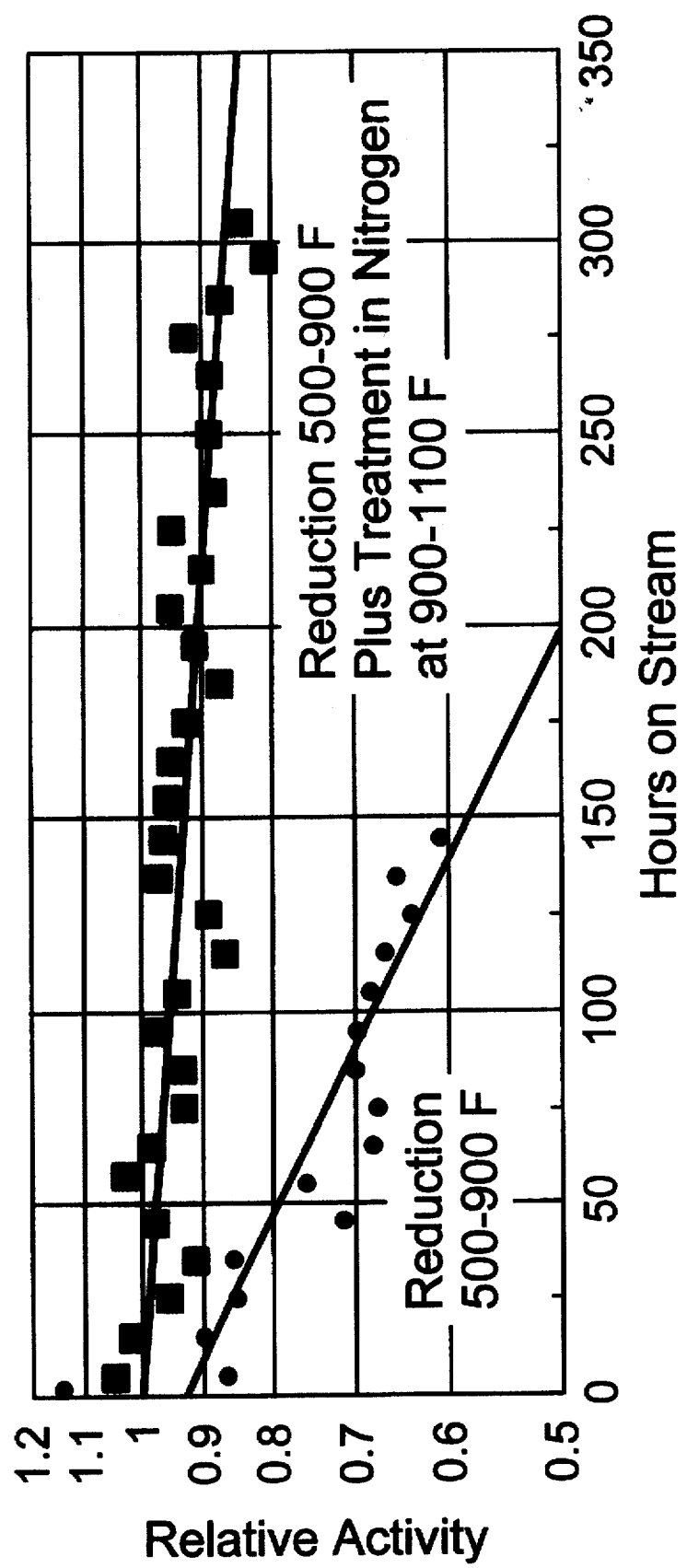

HIGH TEMPERATURE TREATMENT OF REFORMING CATALYST WITH AN INERT GAS

BACKGROUND OF THE INVENTION

The present invention concerns a high temperature treatment method useful for increasing the conversion and lowering the fouling rate of a reforming catalyst.

Catalytic reforming is a well-known process that is used for raising the octane rating of a naphtha for gasoline and producing aromatic hydrocarbons for the petrochemical industry. The reactions that occur during reforming include: dehydrogenation of cyclohexanes, hydrodecyclization of alkylcyclopentanes, dehydrocyclization of acyclic hydrocarbons, dealkylation of alkylbenzenes, isomerization of paraffins, and hydrocracking of paraffins. The hydrocracking reaction should be suppressed because that reaction lowers the yield of hydrogen and lowers the yield of liquid products.

Reforming catalysts must be selective for dehydrocyclization in order to produce high yields of liquid product and low yields of light gases. These catalysts should possess good activity in order to reduce the amount of catalyst required. Also, they should possess good stability, so that they can maintain a high activity and a high selectivity for dehydrocyclization over a long period of time.

While most reforming catalysts contain platinum on an alumina support, large-pore zeolites have been proposed as supports. These large-pore zeolites have pores large enough for hydrocarbons in the gasoline boiling range to pass through. Commercial application of zeolitic reforming catalysts have thus far been limited to a few plants processing light naphtha to make benzene and toluene, although certain catalysts comprising a large-pore zeolite containing at least one Group VIII metal have a very high selectivity for dehydrocyclization.

It is known that pretreatment with hydrogen is required prior to utilizing these zeolite catalysts for reforming naphtha feedstocks. For example, U.S. Pat. No. 4,517,306 issued to Waldeen Buss on May 14, 1985 claims a composition comprising: (a) a type L zeolite; (b) at least one Group VIII metal; and (c) an alkaline earth metal selected from the group consisting of barium, strontium and calcium, wherein said composition is reduced in a hydrogen atmosphere at a temperature of from 480° C. to 620° C. (896° to 1148° F.). It is preferred that the composition be reduced at a temperature from 550° to 620° C. (1022° to 1148° F.).

U.S. Pat. No. 4,539,304 issued on Sep. 3, 1985 to Field discloses a two-step pretreatment process for increasing the conversion of reforming catalysts wherein the catalyst is first treated at a temperature of from 120° C. (248° F.) to 260° C. (500° F.) in a reducing gas. In the second step, the temperature of the catalyst is maintained at 370° C. (698° F.) to 600° C. (1112° F.) in a reducing atmosphere.

U.S. Pat. No. 4,539,305 issued on Sep. 3, 1985 to Wilson et al. discloses a pretreatment process for enhancing the selectivity and increasing the stability of a reforming catalyst comprising a large-pore zeolite containing at least one Group VIII metal. The catalyst is reduced in a reducing atmosphere at a temperature of from 250° C. (482°) to 650° (1202° F.). The reduced catalyst is subsequently exposed to an oxygen-containing gas and then treated in a reducing atmosphere at a temperature of from 120° C. (248° F.) to 260° C. (500° F.). Finally, the catalyst is maintained at a temperature of from 370° C. (698° F.) to 600° C. (1112° F.) in a reducing atmosphere. Preferably, the first reduction step is carried out in the presence of hydrogen.

U.S. Pat. No. 5,155,075 issued to Innes et al. shows an initial catalyst reduction at 300° F. to 700° F., followed by a temperature ramp up to a final hydrogen treatment temperature between 900° F. and 1000° F.

U.S. Pat. No. 5,066,632 issued on Nov. 19, 1991 to Baird et al. discloses a process for pretreating a catalyst useful for reforming a naphtha wherein the catalyst is calcined at temperatures in excess of 500° F., preferably at temperatures ranging from 500° F. to about 750° F. in air or in atmospheres containing low partial pressures of oxygen or in a non-reactive or inert gas such as nitrogen. The catalyst is then contacted with a dry hydrogen-containing gas at a temperature ranging from about 600° F. to about 1000° F., preferably from about 750° F. to about 950° F., at a hydrogen partial pressure ranging from about 1 atmosphere to about 40 atmospheres, preferably from 5 atmospheres to about 30 atmospheres.

European Patent Application Publication Number 243, 129 discloses a catalyst activation treatment with hydrogen at temperatures from 400° C. (752° F.) to 800° C. (1472° F.), preferably from 400° C. (752° F.) to 700° C. (1292° F.), for a catalyst used for cracking a hydrocarbon feedstock. The treatment pressure may vary from 100 to 5,000 MPa but is preferably from 100 to 2,000 MPa. A carrier gas which contains 1–100% v/v, preferably from 30–100% v/v, of hydrogen is used.

U.S. Pat. No. 4,717,700 issued to Venkatram et al discloses a method for drying a zeolite catalyst by heating while in contact with a gas. The rate of catalyst temperature increase is controlled so as to limit the rate of water evolution from the catalyst and the water vapor concentration in the gas. The gas used to heat the catalyst is gradually increased in temperature at about 28° C. per hour. The moisture level of the effluent gas is preferably between 500 and 1500 ppmv during the drying step. The catalyst drying method with a subsequent reduction with hydrogen wherein the temperature is raised to a maximum temperature of 450° C. is exemplified in Example 1 of the patent.

Austrian Patent Specification No. 268,210 relates to a metal-charged zeolite molecular sieve, which is suitable as a catalyst for the conversion of hydrocarbons. Methods for preparing the catalyst are described. It is disclosed that the catalyst prepared by such methods usually has a high water content and that it is desirable to activate the catalyst before use since the catalyst is sensitive to water. The recommended activation process comprises: 1) slow heating of the catalyst in air at 300° to 600° C., preferably 500° C.; followed by 2) slow heating of the catalyst from room temperature to approximately 500° C. in a current of hydrogen gas under atmospheric pressure.

As temperatures are increased above 1025° F., the hazards of using hydrogen as a pretreatment gas increase. For example, leaks may occur and the leaking gas may ignite. A novel process is therefore needed for treating zeolite reforming catalysts, which process is simple, economically attractive, safe and effective.

Accordingly, an object of the present invention is to provide such a novel high temperature treatment for a zeolite reforming catalyst.

It is another object of the present invention to overcome the problems inherent in pretreating catalysts at high temperatures with hydrogen. It is another object of the present invention to provide a pretreatment for a zeolite reforming catalyst which is simple and effective, and results in improved catalyst performance.

These and other objects of the present invention will become apparent upon a review of the following specification, the Drawing and the claims appended thereto.

SUMMARY OF THE INVENTION

The present invention is a process for increasing the conversion and lowering the fouling rate of large-pore zeolitic reforming catalysts using a high temperature treatment process. The method comprises reducing the catalyst by contact with a reducing gas at a temperature of less than 1025° F. The catalyst is then contacted with an inert gas in the temperature range of from 1025° F. to 1275° F. Preferably, the water level of the effluent gas during the treatment in the temperature range of from 1025° F. to 1275° F. is maintained below 200 ppmv.

Among other factors, we have found that large-pore zeolitic catalysts which have been reduced at a temperature of less than 1025° F. and then contacted with an inert gas environment in the temperature range of from 1025° F. to 1275° F. are found to exhibit a lower fouling rate and improved activity, and have a longer run life. In particular, such catalysts exhibit a longer run life with heavier feedstocks than with similar catalysts using other pretreatment processes. For example, if an L zeolite catalyst is pretreated by conventional methods, run lengths with feeds containing $C_9+$ hydrocarbons are generally short. The pretreatment procedure of this invention, however, makes it practical to process feedstocks containing as much as 5–15 wt % $C_9+$ hydrocarbons, or even more.

Thus, the present inventors have discovered an advantageous high temperature catalyst treatment method which does not require the use of hydrogen at temperatures above 1025° F. In particular, the present invention has surprisingly found that a high temperature treatment (i.e., at 1025° F. to 1275° F.) in an inert gaseous environment subsequent to reduction at a lower temperature will result in a catalyst with a reduced fouling rate and sufficient catalytic activity to yield a longer run life, particularly if the water content of the effluent gas is kept as low as possible during the high temperature treatment range. Surprisingly, this is true even though an inert atmosphere is used during the high temperature treatment. Even catalysts that are on balance non-acidic still contain a few residual acidic sites. This high temperature treatment regimen is believed to reduce the number of acid sites on the catalyst, and thereby reduce side reactions which lead to the formation of coke. The improved fouling rate and conversion activity of the catalyst makes it practical to use feedstocks containing $C_9+$ hydrocarbons.

BRIEF DESCRIPTION OF THE DRAWING

The FIGURE of the Drawing graphically depicts the catalyst deactivation rate of a catalyst which was not subjected to a high temperature treatment and one which was subjected to a high temperature treatment in accordance with the present invention.

DETAILED DESCRIPTION OF THE PREFERRED EMBODIMENTS

In its broadest aspect, the present invention is a process for increasing the conversion and/or lowering the fouling rate of large-pore zeolitic reforming catalysts using a high temperature treatment process. The catalyst is treated in an inert gas environment at a temperature of from 1025° F. to 1275° F. subsequent to reduction. By "reduction", for the purposes of the present invention, is meant that the Group VIII metal component of the catalyst is converted from the ionic or oxide form to highly dispersed metal particles.

For a commercial size plant, it is necessary to limit the moisture content of the environment during the high temperature treatment in order to prevent significant catalyst deactivation. In the temperature range of from 1025° F. to 1275° F., the presence of moisture is believed to have a severely detrimental effect on the catalyst activity, regardless of the type of environment in which the treatment takes place, and it has therefore been found necessary to limit the moisture content of the environment to as little water as possible during said treatment period, to at least less than 200 ppmv. The moisture content of the environment prior to the temperature range of 1025° F. to 1275° F. can also be limited to less than 200 ppmv as a precaution, for example in the temperature range of from 900° F. to 1025° F. This would result in the effluent gas water level being maintained below 200 ppmv in the temperature range of from 900° F. to 1025° F. as well.

In one embodiment, in order to limit exposure of the catalyst to water vapor at high temperatures, it is preferred that the catalyst be reduced initially at a temperature between 300° F. and 700° F. After most of the water generated during catalyst reduction has evolved from the catalyst, the temperature is raised slowly in ramping or stepwise fashion to a maximum temperature between 1025° F. and 1275° F. During the treatment in the temperature range of from 1025° F. to 1275° F., the atmosphere, in accordance with the present invention, is that of an inert gas. The length of time of the treatment at maximum temperature can be up to one-hundred hours, depending on the temperature and flow rate of the gas. The higher the final temperature and gas hourly space velocity, the shorter the time required to achieve the desired effect.

The temperature program and gas flow rates should be selected to limit water vapor levels in the reactor effluent to less than 200 ppmv and, preferably, less than 100 ppmv when the catalyst bed temperature exceeds 1025° F. The rate of temperature increase to the final activation temperature will typically average between 5° and 50° F. per hour. Generally, the catalyst will be heated at a rate between 10° and 25° F./h. It is preferred that the gas flowing through the catalyst bed (GHSV) during this process exceeds 500 volumes per volume of catalyst per hour, where the gas volume is measured at standard conditions of one atmosphere and 60° F. From a catalyst performance viewpoint, the higher the GHSV the better. GHSV's in excess of 10,000 $h^{-1}$ will normally exceed the compressor capacity. GHSV's between 600 and 2000 $h^{-1}$ are most preferred from a practical standpoint.

The high temperature treatment process of the present invention preferably occurs prior to contacting the reforming catalyst with a hydrocarbon feed. The large-pore zeolitic catalyst is generally treated in an inert gaseous atmosphere in the temperature range of from 1025° F. to 1275° F. The preferred inert gas used is nitrogen, for reasons of availability and cost. Other inert gases, however, can be used, such as helium, argon and krypton, or mixtures thereof. The use of purely an inert gas atmosphere for the high temperature treatment allows one to avoid the problems inherent in using a reducing gas such as hydrogen.

The inert gas entering the reactor should contain less than 100 ppmv water. It is preferred that it cobrain less than 10 ppmv water. In a commercial operation, the reactor effluent may be passed through a drier containing a desiccant or sorbent such as 4 Å molecular sieves. The dried gas containing less than 100 ppmv water or, preferably, less than 10 ppmv water may then be recycled to the reactor.

It is important, however, that the catalyst be reduced prior to treatment into the inert atmosphere in the temperature range of from 1025° to 1275° F. For it has been found that simply heating the catalyst in a nitrogen atmosphere to elevated temperatures can damage the catalyst. The catalyst must therefore, be first reduced. The reducing gas is preferably hydrogen, although other reducing gases can also be used. The hydrogen is generally mixed with an inert gas such as nitrogen, with the amount of hydrogen in the mixture generally ranging from 1–99% by volume. More typically, however, the amount of hydrogen (or other reducing gas) in the mixture ranges from about 10–50% by volume.

In a preferred embodiment, the zeolite catalyst is reduced by contact with a reducing gas in a temperature range of from 300° to 700° F. After the initial reduction, the flow of reducing gas is continued while the catalyst is heated to a temperature between 800° F. and 1025° F. At this point, the reactor system is purged with an inert gas. The catalyst is then heated to a final temperature between 1025° F. and 1275° F.

In another preferred embodiment, the catalyst can be dried in an inert atmosphere such as a nitrogen atmosphere prior to reduction. The drying can take place while heating the catalyst in flowing nitrogen from ambient temperature to the initial reduction temperature. For example, a catalyst comprising platinum supported on L-zeolite can be dried in flowing nitrogen atmosphere while heating from ambient temperatures to a temperature between about 300° F. and 700° F. The catalyst can then be reduced in a flowing gas stream comprising hydrogen at an initial temperature between about 300° F. and 700° F. The temperature of the reducing gas can then be raised to about 800° to 1000° F. to complete the catalyst reduction, with the catalyst being further dried in flowing nitrogen while raising the temperature to 1025° F. To complete the method, the catalyst is then treated in a temperature range of from 1025° F. to 1275° F. in flowing nitrogen while maintaining the water level of effluent gas below 200 ppmv.

The feed to the reforming process is typically a naphtha fraction that contains primarily paraffins and naphthenes in the six to eleven carbon number range. Especially preferred for the reforming process of the present invention are feeds which give high yields of benzene, toluene and xylenes. These include the $C_6$, $C_6$–$C_7$, $C_6$–$C_8$, and $C_6$–$C_9$ naphtha fractions. This feed should be substantially free of sulfur, nitrogen, metals and other known catalyst poisons. These poisons can be removed by first using conventional hydrofining techniques, then using sorbents to remove the remaining sulfur compounds and water.

As mentioned above, the catalyst of the present invention exhibits a longer run life with heavier feedstocks, e.g., containing at least 5 wt % $C_9$+ hydrocarbons, and more preferably at least 10 wt % $C_9$+, than similar catalysts having been subjected to a different treatment. For example, if a L zeolite catalyst is reduced and/or pretreated by conventional methods, run lengths with feeds containing at least 5 wt % $C_9$+ hydrocarbons, and typically from 5–15 wt % $C_9$+ hydrocarbons, are comparatively short. The catalyst obtained via the treatment of the present invention, however, makes it quite practical to process such feedstocks containing 5–15 wt % or even more $C_9$+ hydrocarbons.

The feed can be contacted with the catalyst in either a fixed bed system, a moving bed system, a fluidized system, or a batch system. Either a fixed bed system or a moving bed system is preferred. In a fixed bed system, the preheated feed is passed into at least one reactor that contains a fixed bed of the catalyst. The flow of the feed can be either upward, downward, or radial. The pressure is from about 1 atmosphere to about 500 psig, with the preferred pressure being from about 50 psig to about 200 psig. The preferred temperature is from about 800° F. to about 1025° F. The liquid hourly space velocity (LHSV) is from about 0.1 $hr^{-1}$ to about 10 $hrs^{-1}$, with a preferred LHSV of from about 0.3 $hr^{-1}$ to about 5 $hr^{-1}$. Enough hydrogen is used to insure a hydrogen to hydrocarbon feed molar ratio of up to about 20:1. The preferred $H_2$/HC ratio is from about 1:1 to about 6:1. Reforming produces hydrogen. Thus, additional hydrogen is not needed except when the catalyst is reduced and when the feed is first introduced. Once reforming is underway, part of the hydrogen that is produced is recycled over the catalyst.

The catalyst is a large-pore zeolite charged with at least one Group VIII metal. The preferred Group VIII metal is platinum, which is more selective for dehydrocyclization and which is more stable under reforming reaction conditions than other Group VIII metals. The catalyst should contain between 0.1% and 5% platinum of the weight of the catalyst, preferably from 0.1% to 1.5%.

The term "large-pore zeolite" is defined as a zeolite having an effective pore diameter of from 6 to 15 Angstroms. The preferred pore diameter is from 6.5 to 10 Angstroms. Type L zeolite, zeolite X, and zeolite Y, zeolite beta and synthetic zeolites with the mazzite structure are thought to be the best large-pore zeolites for this operation. Type L zeolite is described in U.S. Pat. No. 3,216,789. Zeolite X is described in U.S. Pat. No. 2,882,244. Zeolite beta is described in U.S. Pat. No. 3,308,069. ZSM-4, described in U.S. Pat. No. 4,021,447, is an example of a zeolite with the mazzite structure. Zeolite Y is described in U.S. Pat. Nos. 3,130,007. 3,216,789; 2,882,244; 3,130,007; 3,308,069; and 4,021,447 are hereby incorporated by reference to show zeolites useful in the present invention. The preferred zeolite is type L zeolite.

Type L zeolites are synthesized largely in the potassium form. These potassium cations are exchangeable, so that other type L zeolites can be obtained by ion exchanging the type L zeolite in appropriate solutions. It is difficult to exchange all of the original cations, since some of these cations are in sites which are difficult to reach. The potassium may be ion exchanged with an alkali or alkaline earth metal, such as sodium, lithium, cesium, rubidium, barium, strontium, or calcium. Preferably, the total amount of alkali and alkaline earth metal ions should be enough to satisfy the cation exchange sites of the zeolite or be slightly in excess. It is also preferred that the L zeolite contain exchangeable cations where at least 90% are selected from the group consisting of Li, Na, K, Rb, Cs, Ba and Sr ions, or mixtures thereof.

An inorganic oxide can be used as a carrier to bind the large-pore zeolite. This carrier can be natural, synthetically produced, or a combination of the two. Preferred loadings of inorganic oxide are from 5% to 50% of the weight of the catalyst. Useful carriers include silica, alumina, aluminosilicates, and clays.

The high temperature treatment of the present invention, therefore, provides one with a method for safely and effectively producing zeolite reforming catalysts which exhibit a lower fouling rate and improved activity, and have a longer run life. In particular, such advantageous characteristics are exhibited with heavier feedstocks containing large amounts of $C_9$+ hydrocarbons. By first reducing the catalyst at lower temperatures and using an inert gas such as nitrogen at the higher temperatures, one enjoys the safety and availability of nitrogen at higher temperatures while producing an excellent zeolite reforming catalyst.

The invention will be illustrated in greater detail by the following specific examples. It is understood that these examples are given by way of illustration and are not meant to limit the disclosure or the claims to follow. All water measurements are in parts per million by volume (ppmv).

EXAMPLES

The following examples illustrate the discovery that high temperature treatment with nitrogen has a beneficial effect on a Pt-L-Zeolite catalyst. As demonstrated below, the fouling rate after a high temperature treatment in flowing nitrogen was one-sixth as that after a conventional catalyst activation.

COMPARATIVE EXAMPLE

A one gram sample of 20–40 mesh catalyst comprising 0.6 wt % platinum on silica-bound, barium exchanged, zeolite L was charged to a one-quarter inch O.D. tubular microreactor. The catalyst was dried in flowing nitrogen while heating from room temperature to 500° F. The nitrogen flow rate was 550 standard cubic centimeters per minute. The nitrogen flow was replaced with hydrogen flowing at the same rate, and the catalyst was reduced initially at 500° F. The hydrogen flow was continued while the catalyst was heated from 500° F. to 900° F.

The catalyst was then tested for its ability to aromatize a $C_6$–$C_8$ feedstock at 4.4 weight hourly space velocity, 875° F., 50 psig, and 5.0 hydrogen/hydrocarbon feed molar ratio. The FIGURE of the Drawing shows how the relative activity for the conversion of $C_6$–$C_8$ nonaromatic hydrocarbons declined with time. The calculation of activity makes the approximation that the disappearance of $C_6$ to $C_8$ nonaromatics is a first-order reaction. The table below shows how the conversion of nonaromatics and the selectivity to aromatics and hydrogen changed with time on stream.

EXAMPLE

The Comparative Example was repeated except that an additional pretreatment step in accordance with the present invention was added after completing reduction at 900° F. The flowing gas was changed to 550 cm³/min of nitrogen and the catalyst was heated at 10° F./h between 900° F. to 1100° F. The water levels in the reactor effluent during this time were maintained below 10 ppmv. Upon reaching 1100° F., the catalyst was cooled to 875° F. as in the Comparative Example.

The FIGURE shows the results. The catalyst deactivation rate after the high temperature nitrogen treatment was one-sixth that obtained in the Comparative Example. The Table below shows that the catalyst activated by the procedure of the present invention also was more selective for the production of aromatics and hydrogen.

TABLE

Comparison of Catalyst Performance

| Comparative Example | | | Example | | |
|---|---|---|---|---|---|
| Time on Stream Hours | Conversion Wt % | Selectivity Wt % | Time on Stream Hours | Conversion Wt % | Selectivity Wt % |
| 1 | 71.4 | 88.7 | 5 | 70.5 | 91.4 |
| 51 | 52.5 | 91.1 | 105 | 64.3 | 93.6 |
| 105 | 50.3 | 93.1 | 205 | 62.7 | 94.0 |
| 145 | 45.9 | 92.9 | 305 | 60.6 | 94.5 |

Conditions: 875° F., 50 psig, H2/HC=5.0, WHSV=4.4

While the invention has been described with preferred embodiments, it is to be understood that variations and modifications may be resorted to as will be apparent to those skilled in the art. Such variations and modifications are to be considered within the purview and scope of the claims appended hereto.

What is claimed is:

1. A method of treating a reforming catalyst comprising a large-pore zeolite having an effective pore diameter of from 6 to 15 Anstroms containing at least one Group VIII metal, wherein said catalyst, after being reduced, is treated in an inert gas atmosphere in the temperature range of from 1025° to 1275° F. while maintaining the water level of effluent gas below 200 ppmv.

2. The method of claim 1, wherein the inert gas flows over the catalyst at a GHSV of at least 500 h$^{-1}$.

3. The method of claim 1, wherein the catalyst is reduced by contacting with a reducing gas which comprises hydrogen.

4. The method of claim 1, wherein the catalyst reduction is substantially completed at a temperature of 900° F. or less.

5. The method of claim 1, wherein the inert gas comprises nitrogen, helium, argon, krypton or mixtures thereof.

6. The method of claim 5, wherein the inert gas comprises nitrogen.

7. The method of claim 1, wherein the Group VIII metal is platinum.

8. The method of claim 7, wherein the amount of platinum is in the range of from 0.1 to 1.5 wt. %.

9. The method of claim 1, wherein the catalyst comprises an L zeolite containing platinum.

10. The method of claim 9, wherein the zeolite L contains exchangeable cations, at least 90% of which are selected from the group consisting of Li, Na, K, Rb, Cs, Ba and Sr ions, or mixtures thereof.

11. A method of treating a reforming catalyst comprising a large-pore zeolite having an effective pore diameter of from 6 to 15 Angstroms containing at least one Group VIII metal, wherein said catalyst is reduced by contact with a reducing gas in a temperature range of from 300° to 900° F., and the reduced catalyst is subsequently treated with an inert gas in the temperature range of from 1025° to 1275° F. while maintaining the water level of the effluent gas below 200 ppmv.

12. The method of claim 11, wherein the reducing gas comprises hydrogen.

13. The method of claim 11, wherein the temperature rise of from 900° F. to 1025° F. is in an inert gas atmosphere.

14. The method of claim 13, wherein the effluent gas water level is maintained below 200 ppmv in the temperature range of from 900° F. to 1025° F.

15. The method of claim 11, wherein the inert gas comprises nitrogen.

16. The method of claim 11, wherein the catalyst is first dried in an inert gas atmosphere while heating from ambient temperature to 500° F., and then the catalyst is reduced in a reducing gas atmosphere while heating from about 500° to about 900° F.

17. A method of pretreating a catalyst comprising platinum supported on zeolite L, with said method comprising
   (i) drying the catalyst in flowing nitrogen atmosphere while heating from ambient temperature to a temperature between about 300° F. and 700° F.;
   (ii) reducing the catalyst in a flowing gas stream comprising hydrogen at an initial temperature between about 300° F. and 700° F.;
   (iii) raising the temperature of the reducing gas to about 800° to 1000° F. to complete the catalyst reduction;
   (iv) further drying the catalyst in flowing nitrogen while raising the temperature to 1025° F.; and
   (v) treating the catalyst in the temperature range of from 1025° F. to 1275° F. in flowing nitrogen while maintaining the water level of effluent gas below 200 ppmv.

18. The method according to claim 17, wherein the zeolite L contains exchangeable cations, at least 90% of which are selected from the group consisting of Li, Na, K, Rb, Cs, Ba and Sr ions, or mixtures thereof.

19. A reforming process comprised of contacting a hydrocarbon feed under reforming conditions with a large pore zeolite catalyst having an effective pore diameter of from 6 to 15 Angstroms containing at least one Group VIII metal, wherein the catalyst has been treated by the method according to claim 1.

20. The reforming process of claim 19, wherein the catalyst contains platinum.

21. A reforming process comprised of contacting a hydrocarbon feed under reforming conditions with a zeolite L catalyst containing platinum, wherein the catalyst has been treated by a method according to claim 17.

* * * * *